(12) United States Patent
Doerr

(10) Patent No.: US 10,488,682 B2
(45) Date of Patent: Nov. 26, 2019

(54) DISTRIBUTED CMOS DRIVER WITH ENHANCED DRIVE VOLTAGE FOR SILICON OPTICAL PUSH-PULL MACH-ZEHNDER MODULATORS

(71) Applicant: ACACIA COMMUNICATIONS INC., Maynard, MA (US)

(72) Inventor: Christopher Doerr, Maynard, MA (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 14/475,503

(22) Filed: Sep. 2, 2014

(65) Prior Publication Data

US 2015/0062689 A1 Mar. 5, 2015

Related U.S. Application Data

(60) Provisional application No. 61/872,658, filed on Aug. 31, 2013.

(51) Int. Cl.
G02F 1/01 (2006.01)
G02F 1/21 (2006.01)
G02F 1/225 (2006.01)

(52) U.S. Cl.
CPC ............ *G02F 1/0121* (2013.01); *G02F 1/218* (2013.01); *G02F 1/225* (2013.01); *G02F 2001/212* (2013.01); *G02F 2201/126* (2013.01)

(58) Field of Classification Search
CPC .......... G02F 1/01; G02F 1/0123; G02F 1/225; G02F 2001/212; G02F 2203/50
USPC ...... 359/279, 333, 337.11–337.13, 342, 345, 359/346, 349, 182, 183, 188, 192, 195, 359/198, 140, 141, 162; 398/182, 183, 398/188, 192, 195, 198, 140, 141, 162; 257/65, 69, 212; 315/250, 201, 185
See application file for complete search history.

(56) References Cited

U.S. PATENT DOCUMENTS

| | | | |
|---|---|---|---|
| 6,265,893 B1 * | 7/2001 | Bates | H03K 19/0005 326/27 |
| 8,346,025 B2 | 1/2013 | Gill | |
| 9,036,954 B2 | 5/2015 | Kobrinsky et al. | |
| 9,531,478 B2 | 12/2016 | Zheng et al. | |
| 2003/0025962 A1 * | 2/2003 | Nishimura | G02B 6/12007 398/79 |
| 2003/0227666 A1 | 12/2003 | Bridges | |
| 2011/0318016 A1 * | 12/2011 | Wyss | H04B 10/2503 398/141 |
| 2012/0163811 A1 | 6/2012 | Doany et al. | |

(Continued)

FOREIGN PATENT DOCUMENTS

JP 5994230 B2 9/2016

OTHER PUBLICATIONS

PCT/US2017/038489, Sep. 13, 2017, International Search Report and Written Opinion.

(Continued)

*Primary Examiner* — William R Alexander
*Assistant Examiner* — Tamara Y. Washington
(74) *Attorney, Agent, or Firm* — Joseph D'Angelo

(57) ABSTRACT

Disclosed are structures and methods for CMOS drivers that drive silicon optical push-pull Mach-Zehnder modulators (MZMs) with twice the drive voltage per interferometer arm as with prior art designs.

13 Claims, 1 Drawing Sheet

(56) References Cited

U.S. PATENT DOCUMENTS

| | | |
|---|---|---|
| 2013/0176609 A1 | 7/2013 | Noguchi |
| 2014/0133866 A1* | 5/2014 | Liu .................... H05B 37/0272 398/182 |
| 2015/0030339 A1* | 1/2015 | Margalit .............. H04B 10/506 398/183 |
| 2015/0036965 A1 | 2/2015 | Prosyk et al. |
| 2015/0049978 A1 | 2/2015 | Fujikata et al. |
| 2015/0229408 A1 | 8/2015 | Ding et al. |
| 2016/0103382 A1 | 4/2016 | Liboiron-Ladouceur et al. |
| 2016/0218811 A1 | 7/2016 | Chen et al. |
| 2017/0285437 A1 | 10/2017 | Doerr et al. |
| 2018/0039151 A1 | 2/2018 | Doerr et al. |

OTHER PUBLICATIONS

Milivojevic et al., 112Gb/s DP-QPSK Transmission Over 2427km SSMF Using Small-Size Silicon Photonic IQ Modulator and Low-Power. 2013 Optical Fiber Communication Conference and Exposition and the National Fiber Optic Engineers Conference (OFC/NFOEC), Anaheim, CA. Mar. 17-21, 2013; 5-7.

International Search Report and Written Opinion dated Sep. 13, 2017 in connection to International Application No. PCT/US2017/038489.

* cited by examiner

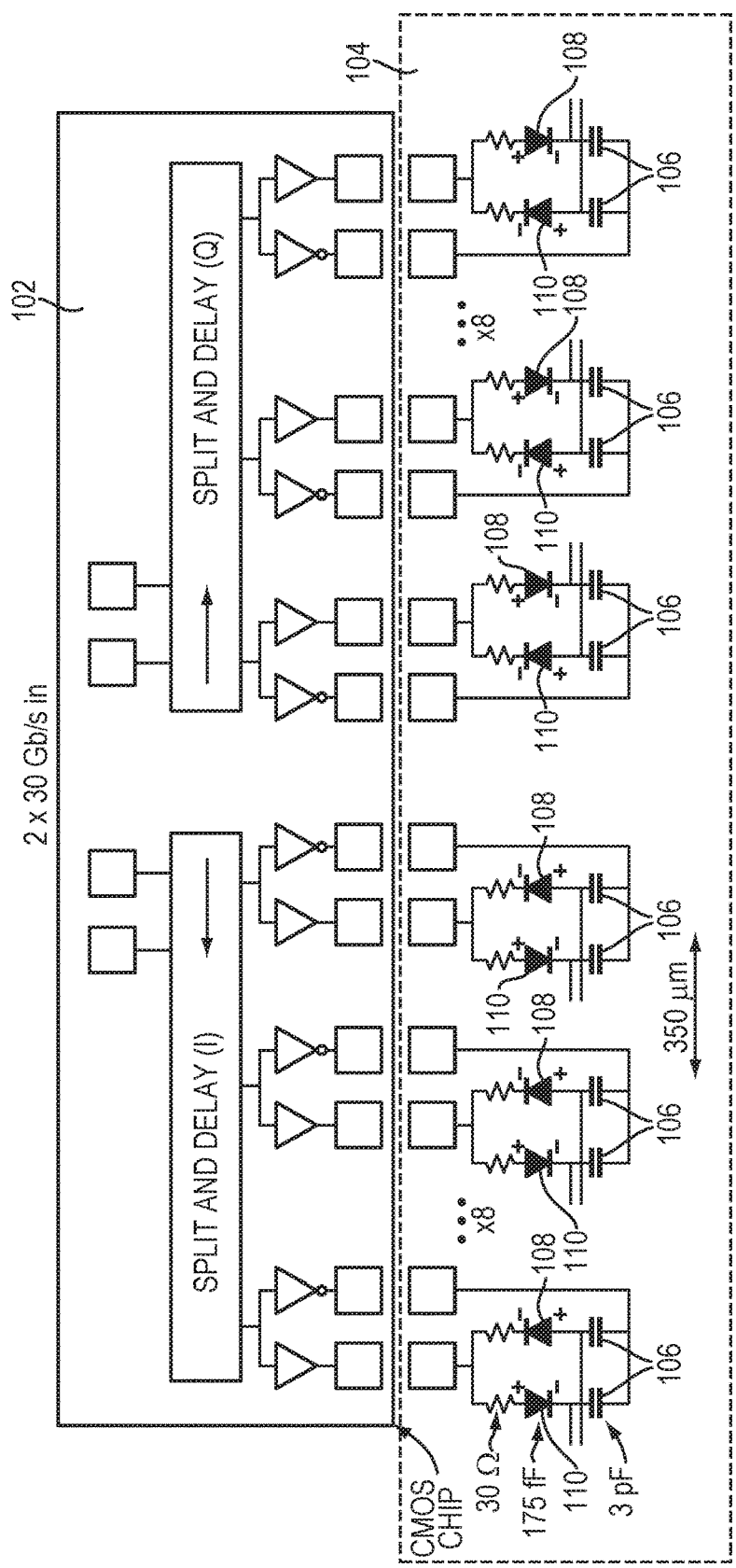

DISTRIBUTED CMOS DRIVER WITH ENHANCED DRIVE VOLTAGE FOR SILICON OPTICAL PUSH-PULL MACH-ZEHNDER MODULATORS

CROSS REFERENCE TO RELATED APPLICATIONS

This application claims the benefit of U.S. Provisional Patent Application Ser. No. 61/872,658 filed Aug. 31, 2013 which is incorporated by reference in its entirety as if set forth at length herein.

TECHNICAL FIELD

This disclosure relates generally to optical communications systems. More particularly, this disclosure pertains to techniques, methods and apparatus for CMOS drivers that drive silicon optical push-pull Mach-Zehnder modulators (MZMs) exhibiting twice the drive voltage per interferometer arm as with prior art designs.

BACKGROUND

Contemporary optical communications systems make extensive use of silicon optical modulators and complementary metal-oxide-semiconductor (CMOS) electronics which may advantageously drive the silicon optical modulators at very high speeds with while consuming very low power. Accordingly, improved driver configurations for such optical transceivers would represent a welcome addition to the art.

SUMMARY

An advance in the art is made according to an aspect of the present disclosure directed to method(s) and driver(s) for driving silicon optical push-pull Mach-Zehnder modulators (MZMx) wherein individual interferometer arms are driven with twice the drive voltage as compared with other, known configurations.

In contrast to contemporary prior-art configurations wherein the modulator is connected directly to CMOS transistors, and diodes employed in such configurations are connected back-to-back—in series, modulator drivers according to the present disclosure drive the diodes in parallel.

BRIEF DESCRIPTION OF THE DRAWING

A more complete understanding of the present disclosure may be realized by reference to the accompanying drawing in which:

FIG. 1 shows a schematic of an illustrative CMOS driver according to an aspect of the present disclosure.

DETAILED DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known circuits, structures and techniques have not be shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

By way of some additional background, we begin by again noting that complementary metal-oxide-semiconductor (CMOS) electronics may drive silicon optical modulators at very high speeds while consuming very low power. (See, e.g., B. Milivojevic, C. Raabe, A. Shastri, M. Webster, P. Metz, S. Sunder, B. Chhattin, S. Wiese, B. Dama, and K. Shastri, "112 Gb/s DP-QPSK Transmission Over 2427 km SSMF Using Small-Size Silicon Photonic IQ Modulator and Low-Power," *Optical Fiber Communication Conference*, 2013, pp. 5-7).

As generally disclosed in the art however, the modulator is connected directly to CMOS transistors, and as such the modulator is "viewed" electronically as a capacitance. Additionally, diodes employed in such configurations are connected back-to-back—in series. While such configurations generally reduce the capacitance by a factor of two, it also reduces the voltage across diode (i.e., each arm of the MZI) by a factor of two as well. As may be appreciated, such design(s) are optimized for modulators having an oxide barrier, which have a high capacitance and low $V_\pi L$.

In contrast to such prior-art configurations, modulator drivers according to the present disclosure drive the diodes in parallel. With reference now to FIG. 1, there is shown a schematic of driver circuitry 102 according to an aspect of the present disclosure. More specifically, the illustrative driver configuration shown is for a two-channel distributed driver according to the present disclosure.

As may be appreciated by those skilled in the art, a distributed driver comprises "breaking", or logically segmenting the optical modulator 104 into multiple sections. As depicted in the illustrative FIG. 1, the optical modulator 104 is logically broken into or segmented into eight sections. Subsequently, each of the sections is driven at an appropriate timing such that an optical group velocity in the modulator is matched.

As may be further understood, larger capacitors 106 (about 10 times the value of the diode capacitance) are added in series, respectively, to the anode (illustrated by the symbol "+") of first diode 108 and the cathode (illustrated by the symbol "−") of second diode 110 such that a DC bias voltage is provided to the diodes. Those skilled in the art will appreciate that while eight illustrative sections are depicted in this illustrative FIG. 1, that number of sections may be changed as appropriate to a particular application.

Shown in FIG. 1 in the upper half of that FIGURE is the CMOS chip while the lower half shows the equivalent circuit of the optical modulator 104. The bond pads are depicted by the rectangular shapes. A first waveguide arm of optical modulator 104 comprises the plurality of first diodes 108, while a second waveguide arm comprises the plurality of second diodes 110.

At this point, those skilled in the art will readily appreciate that while the methods, techniques and structures according to the present disclosure have been described with respect to particular implementations and/or embodiments, those skilled in the art will recognize that the disclosure is not so limited. Accordingly, the scope of the disclosure should only be limited by the claims appended hereto.

The invention claimed is:

1. A silicon optical modulator driver comprising:
   driver circuitry configured to:
      electrically drive, with a first driver, a first plurality of diodes with a first modulating signal, the first plurality of diodes disposed at differing locations on a first common optical waveguide arm of a Mach-Zehnder optical modulator;
      electrically drive, with a second driver different than the first driver, a second plurality of diodes with a second modulating signal, the second plurality of diodes disposed at differing locations on a second common optical waveguide arm of the Mach-Zehnder optical modulator;
   wherein at least a first diode of the first plurality of diodes is electrically connected in parallel to at least a second diode of the second plurality of diodes.

2. A method comprising:
   electrically driving, with a first driver, a first waveguide arm of a Mach-Zehnder optical modulator and, with a second driver different than the first driver, a second waveguide arm of the Mach-Zehnder optical modulator by providing a first modulating voltage to a first plurality of diodes disposed at differing locations on the first waveguide arm and a second modulating voltage to a second plurality of diodes disposed at differing locations on the second waveguide arm;
   wherein at least a first diode of the first plurality of diodes is electrically connected in parallel to at least a second diode of the second plurality of diodes.

3. The method of claim 2, further comprising electrically biasing at least the first diode of the first plurality of diodes using a capacitor connected in series to the first diode of the first plurality of diodes.

4. A Mach-Zehnder optical modulator comprising:
   a first waveguide arm of the Mach-Zehnder optical modulator optically coupled to an input waveguide and to an output waveguide;
   a second waveguide arm of the Mach-Zehnder optical modulator optically coupled to the input waveguide and to the output waveguide;
   a first plurality of diodes disposed at differing locations on the first waveguide arm;
   a second plurality of diodes disposed at differing locations on the second waveguide arm;
   a first driver coupled to the first plurality of diodes; and
   a second driver different than the first driver and coupled to the second plurality of diodes,
   wherein at least a first diode of the first plurality of diodes is electrically connected in parallel to at least a second diode of the second plurality of diodes.

5. The Mach-Zehnder optical modulator of claim 4, further comprising control circuitry configured to electrically drive, with the first driver, the first plurality of diodes and, with the second driver, the second plurality of diodes.

6. The Mach-Zehnder optical modulator of claim 4, further comprising a plurality of capacitors, wherein at least one capacitor of the plurality of capacitors is disposed in series to a corresponding diode of the first plurality of diodes.

7. The Mach-Zehnder optical modulator of claim 6, wherein each capacitor of the plurality of capacitors is disposed in series to a respective diode of the first plurality of diodes.

8. The Mach-Zehnder optical modulator of claim 4, wherein the first and the second waveguide arms are made of silicon.

9. The Mach-Zehnder optical modulator of claim 4, wherein the first diode of the first plurality of diodes has a cathode electrically coupled to an anode of the second diode of the second plurality of diodes.

10. The Mach-Zehnder optical modulator of claim 4, wherein the first diode of the first plurality of diodes has an anode electrically coupled to a cathode of the second diode of the second plurality of diodes.

11. The silicon optical modulator driver of claim 1, wherein the driver circuitry is further configured to electrically bias at least the first diode of the first plurality of diodes using a capacitor connected in series to the first diode of the first plurality of diodes.

12. The silicon optical modulator driver of claim 1, wherein the first diode of the first plurality of diodes has an anode electrically coupled to a cathode of the second diode of the second plurality of diodes.

13. The method of claim 2, wherein electrically driving the first waveguide arm of the Mach-Zehnder optical modulator comprises matching an optical group velocity of an optical mode propagating along the first waveguide arm with the first modulating voltage.

* * * * *